June 10, 1930.  R. F. KNIGHT  1,762,337
RAILWAY DRIVING WHEEL CRANK PIN DEVICE
Filed Oct. 30, 1926
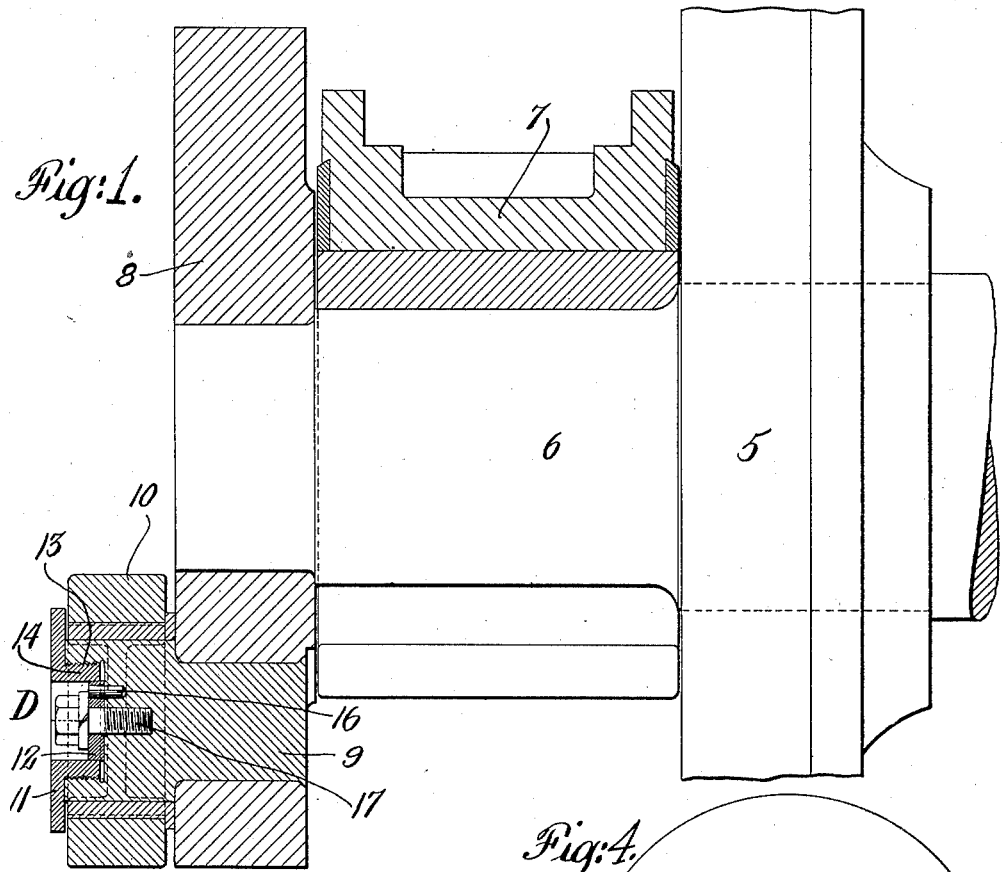
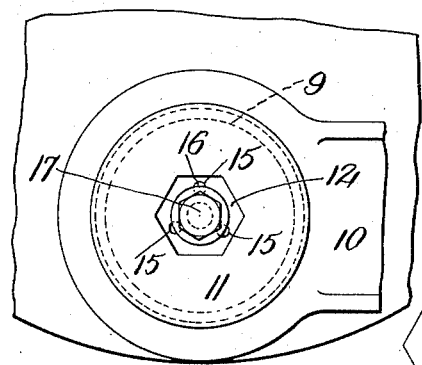
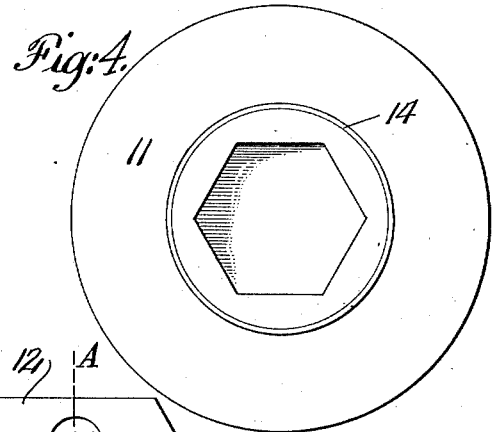
INVENTOR
Ronald F. Knight
BY
Symmestvedt & Lechner
ATTORNEYS Patented June 10, 1930

1,762,337

UNITED STATES PATENT OFFICE

RONALD F. KNIGHT, OF RAMSEY, NEW JERSEY, ASSIGNOR TO FRANKLIN RAILWAY SUPPLY COMPANY, OF NEW YORK, N. Y., A CORPORATION OF DELAWARE

RAILWAY-DRIVING-WHEEL CRANK-PIN DEVICE

Application filed October 30, 1926. Serial No. 145,300.

This invention relates to crank pin devices, and is particularly useful in connection with railway vehicles. The nature and objects and advantages will be, perhaps, best understood from the following brief statement.

In railway practice there are certain definite clearance limitations which have been established by long practice, and which cannot be exceeded. These limitations are particularly incident to electrified lines. The limitations are also such that in many cases it is impossible to apply the usual crank pin and connecting rod constructions to four wheel trucks. This, in turn, has made it impossible heretofore to provide such trucks with booster motor devices, because the application of a booster motor to such trucks usually involves the provision of outside connecting rods, and, as has just been pointed out, in many instances, the clearance limitations would be exceeded if the usual crank pin and connecting rod constructions were employed.

It is a primary object of my invention to provide an improved crank pin device which will make it possible to apply an outside connecting rod and still keep within clearance limitations, and which, among other things, makes it possible to apply a booster to such trucks.

While my invention is particularly useful in connection with booster equipped four wheel trucks, it may be applied to advantage in other mechanisms where a crank pin is employed.

How the foregoing, together with such other objects and advantages as may hereinafter appear, or are incident to my invention, are realized, is illustrated in preferred form in the accompanying drawings, wherein—

Fig. 1 is a fragmentary view of a portion of a railway vehicle wheel and its axle provided with a crank and crank pin device, the latter and the axle box being shown in section.

Fig. 2 is a fragmentary end view of the crank, crank pin device, and connecting rod of Fig. 1.

Fig. 3 is an enlarged face view of a locking plate which I employ in my device.

Fig. 4 is an enlarged face view of a retaining collar which I employ in my device.

Referring to Figs. 1 and 2, it will be seen that I have shown a portion of a railway wheel 5 with its axle 6 journalled in a driving box 7 of any suitable construction, the axle being provided with a crank 8 beyond the driving box 7, which exemplifies construction employed in four wheel motor equipped railway trucks where two pairs of wheels are connected with a connecting rod. The booster motor device is located between the sets of wheels and drives the axle 6 in a manner well understood in this art.

The crank 8 is provided with a crank pin device D, comprising, in general, a crank pin 9 on which is carried the connecting rod 10, a collar 11 for retaining the rod 10, and a locking plate 12.

The crank pin 9 is provided with an internally threaded recess 13 into which the collar or nut 11 is screwed, said collar being provided with an externally threaded hub 14 for this purpose. The collar is provided with a polygonal bore, in this instance of hexagonal form, which permits of the use of a wrench for securing it in place. This collar, when screwed in place, serves to retain the connecting rod on the pin. By having the collar fastening means extend into the end of the pin, I have provided a means for retaining the connecting rod which projects but little beyond the end of the crank pin, thus keeping within clearance limitations.

In order to prevent this collar from becoming loosened in service, I have associated therewith a novel locking device now to be described. The locking plate 12, which is of a polygonal shape corresponding to the bore of the collar 11, is provided with a plurality of unequally spaced openings 15 (see Figs. 2 and 3) adapted to receive the member or pin 16 carried by the crank pin and projecting into the recess 13.

In this particular instance, the locking plate is of hexagon shape, and is provided with three unequally spaced holes by virtue of which eighteen positions of adjustment may be obtained, in addition to which eighteen other positions may be obtained by reversing the plate. It will be apparent that by either increasing the number of holes, or by increasing the number of sides of the polygonal shaped plate, or both, even finer adjustment may be obtained. In this connection it will be noted that the center line of the upper hole coincides with the vertical 120 degree line as indicated at A; that the center line of the lower right hand hole falls slightly past the 120 degree line as indicated at B, and that the center line of the lower left hand hole falls still further past the 120 degree line as indicated at C.

Any suitable means may be employed for preventing displacement of the plate 12, as, for example, the stud and washer 17.

From the foregoing, it will be seen that I have provided a very simple and compact crank pin device in which the rod retaining member is of very flat construction, and in which the securing means extends into the pin and houses or receives the locking device for preventing unintended unscrewing of said member. By employing such a device the overall transverse width of a truck having outside rods may be readily kept down within the limits permissible in railway work, due to side clearances.

Thus, a device which is perfectly satisfactory from a safety standpoint, but nevertheless of a minimum overall length, is provided.

I claim:—

1. The combination with a railway driving wheel, of a crank pin associated with the driving wheel having an internally threaded recess, a rod carried on said pin, a collar for retaining said rod having an externally threaded hub and a polygonal shaped bore, and locking means for said collar comprising a member extending into the aforesaid recess and a polygonal shaped plate fitting said bore, said plate having a plurality of unequally spaced openings to receive said member.

2. The combination with a railway driving wheel, of a crank pin associated with the driving wheel having an internally threaded recess, a rod carried on said pin, a collar for retaining said rod having an externally threaded hub and a polygonal shaped bore, and locking means for said collar comprising a member extending into the aforesaid recess and a polygonal shaped plate fitting said bore, said plate having a plurality of unequally spaced openings to receive said member, together with means for preventing displacement of said plate.

3. The combination with a driving wheel, of a crank pin associated with the driving wheel having an internally threaded recess, a member extending into the recess, a rod carried on said pin, an externally threaded member screwed into said recess to retain said rod, and a plate having a plurality of unequally spaced openings to receive the aforesaid extending member, said plate and said threaded member having engaging means for preventing relative rotative movement thereof, the engaging means of the plate and threaded member being complementary in a plurality of relative positions of the plate and threaded member.

4. The combination with a driving wheel, of a crank pin associated with the driving wheel having a threaded portion and a projecting member, a plate having a plurality of unequally spaced openings to receive said member, and a nut screwed to said threaded portion, said plate and said nut having engaging parts for preventing relative rotative movement thereof, said engaging parts being complementary in a plurality of relative positions of the plate and nut.

5. The combination with a driving wheel, of a crank pin associated with the driving wheel having a threaded portion, a rod carried by said pin, a nut screwed to said threaded portion for retaining the rod, and a plate fitting said nut, the nut and plate having engaging parts which are complementary in a plurality of relative positions of the plate and nut whereby engagement of the plate and nut in a plurality of equal adjustments around their axes is afforded but preventing relative rotative movement thereof when in an adjusted position, and said plate and crank pin having engaging parts to prevent relative rotative movement thereof.

6. The combination with a railway driving wheel, of a crank pin associated with the driving wheel having an internally threaded recess, a rod carried on said pin, a collar for retaining said rod having an externally threaded hub and a non-circular bore, and locking means for said collar comprising a member extending into the aforesaid recess and a non-circular plate fitting said bore, said plate having a plurality of unequally spaced openings to receive said member.

7. The combination with a railway driving wheel, of a crank pin associated with the driving wheel having an internally threaded recess, a rod carried on said pin, a collar for retaining said rod having an externally threaded hub and a bore, and locking means for said collar comprising a member extending into the aforesaid recess, a plate fitting said bore, said plate having a plurality of spaced openings to receive said member, and means preventing relative rotative movement of the plate and collar.

In testimony whereof, I have hereunto signed my name.

RONALD F. KNIGHT.